Aug. 28, 1934.  D. C. PEDERSEN  1,971,938
MOTOR DRIVEN CULTIVATOR
Filed March 4, 1932
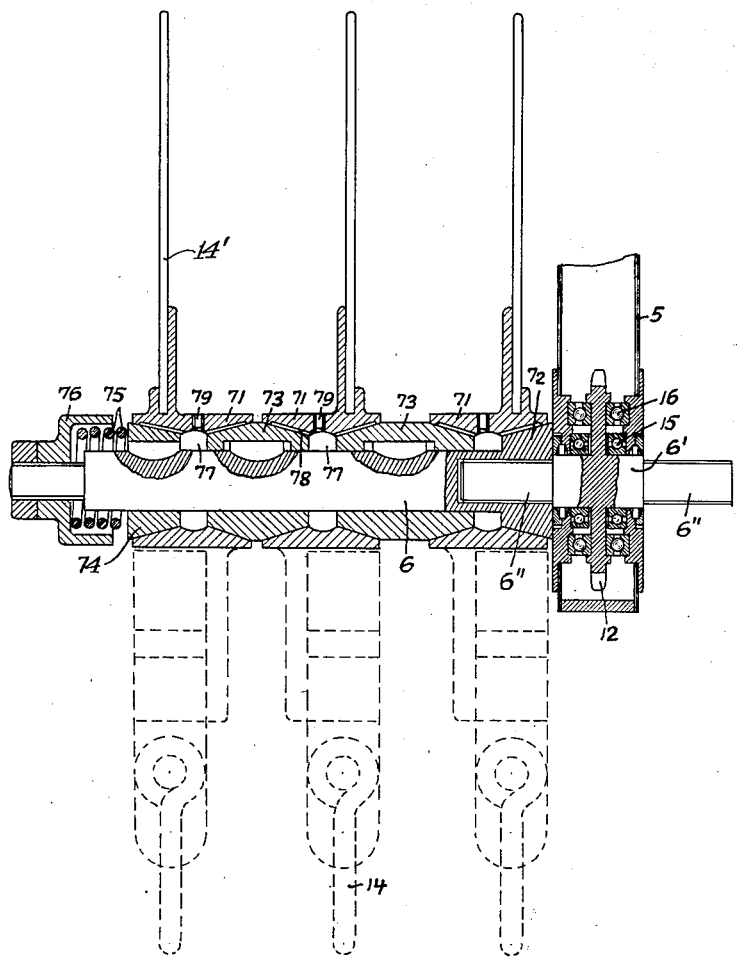

Patented Aug. 28, 1934

1,971,938

UNITED STATES PATENT OFFICE 1,971,938

MOTOR DRIVEN CULTIVATOR

Dines Christian Pedersen, Holbæk, Denmark

Application March 4, 1932, Serial No. 596,890

5 Claims. (Cl. 97—216)

This invention relates to improvements in tilling machines, and particularly to a machine of this character having a rotary tilling tool, the principal object of the invention being to provide improved means for mounting the tool whereby said tool as well as its bearings and driving means are protected against overstraining when the working teeth of the tool encounter obstacles in the soil, such as boulders, tree roots, etc.

More specifically, the object of the invention is to provide improved means for coupling the working teeth of the tilling tool to a rotatable shaft in such a manner that, while the said teeth will rotate with the shaft under normal tilling conditions, should any tooth during such rotation encounter an obstruction of sufficient resistance the said tooth will cease to rotate, notwithstanding the continued rotation of the shaft, until the obstruction has been passed, whereupon the tooth will again rotate with the shaft.

Notwithstanding the provision of such yielding coupling of the teeth, however, there still remains the possibility of a considerable strain arising from the frictional resistance of the tool on its shaft, which strain might be imparted to the bearings of the tool shaft when the latter is journaled centrally of its length in bearings supported on any desired type of motor vehicle in any usual or desired manner. For eliminating any risk of overstraining the bearings in such cases, the invention contemplates combining with the ordinary radial ball-bearings for the tool shaft, axial ball-bearings for the sprocket wheel by means of which rotative motion is imparted to the tool shaft from a main shaft of the machine.

The drawing accompanying this specification is an axial sectional view taken through a rotary tiller shaft and its bearings constructed in accordance with the present invention.

Referring to the drawing, 5 designates a heavily-built casing, adapted to be attached to the rear end of the frame of any desired form of motor vehicle (not shown), said casing enclosing means for transmitting rotary motion to a tiller tool shaft 6 journalled in the casing, which transmission means may be integral with or secured to the central part 6' of the tiller tool shaft. This central part is provided in the usual manner with right and left hand threaded extension 6'' for connection each with the interiorly threaded end of one half of the tiller tool shaft 6. The casing 5 is provided with axial ball-bearings 16 for the sprocket 12, and with radial ball-bearings 15 for the shaft portion 6' for preventing any considerable side pressure on the overhanging ends of the tiller shaft due to excessive load on the radial bearing.

In order that the tiller teeth, when they encounter any fixed obstruction in the soil, for instance a big boulder, a heavy root or the like, may not strain the tiller tool shaft sufficiently to cause breakage of the bearings or transmission members, the tiller teeth, as shown in the drawing (wherein two different forms of teeth, marked respectively 14 and 14' are shown) are frictionally coupled to the tiller shaft 6, in such a manner that, while normally rotating with the shaft, they are capable of yielding to any such excessive resistance against rotation in the working direction. In the present instance, the tiller teeth are arranged in the well-known manner in groups along the shaft 6, each group comprising three or four teeth disposed radially of the shaft in the same plane and spaced 120° or 90° apart, depending on whether the group comprises three or four teeth. All of the teeth of each group are attached to a common hub 71, the diameter of the bore of which is tapered from both ends toward the center. These hubs 71 are mounted on the tiller tool shaft 6 in the following manner: Beginning at one end of the shaft, say the right-hand end, the foremost hub is supported partly on a cone-shaped member 72 secured to the shaft or integral therewith, and partly on one cone surface of a double-cone sleeve 73 mounted on the shaft for rotation therewith and adapted to slide along the shaft. The other cone surface of the said sleeve supports the foremost part of the next hub 71, the rear portion of which is supported on the following sleeve 73 and so forth. The last hub 71, however, is seated with its rearmost interior tapered surface on a single cone sleeve 74, which is rotatable with but adapted to slide on the shaft. By means of a powerful helical spring 75 inserted between the said cone sleeve 74 and a nut 76 threaded on the shaft 6, the said last hub 71 is urged in the direction towards the fixed cone 72 at the opposite end of the shaft portion 6, whereby all of the hubs 71 will be pressed so firmly on to the conical surfaces of the members 72, 73 and 74 that they cannot normally be rotated about the said members, but only when subjected to forces considerably in excess of the resistance normally encountered by the tiller teeth working in the soil. It will thus be seen that each group of tiller teeth may be acted upon separately and independently of the other groups. The pressure of the helical spring 75 against the cone sleeve 74, and consequently the degree of friction between the hubs 71 and the members 72, 73 and 74, can be regulated by means of the nut 76. The members 72, 73 and 74 are spaced apart longitudinally to form between them annular lubricating channels 77 communicating with oil grooves 78 in the tapered bearing surfaces of the hubs and adapted to receive lubricant by way of oil holes 79 in the hubs. The hubs are thus prevented from sticking even when pressed very firmly against their bearing surfaces.

Having thus described my invention, what I claim is:

1. In a rotary tilling machine, a tool shaft mounted for rotation, a plurality of conical bearing members mounted on said shaft for rotation therewith and for movement longitudinally thereof, a plurality of tilling tools provided with hubs having conical bearing surfaces in frictional engagement with said bearing members, and means for exerting pressure on said hubs and bearing members longitudinally of the shaft thereby to regulate the degree of frictional connection between said hubs and bearing members.

2. In a rotary tilling machine, a tool shaft mounted for rotation, a cone shaped bearing member fixedly carried by said shaft at one end thereof, a plurality of sleeves mounted on said shaft for rotation therewith and slidable longitudinally thereof, the periphery of each of said sleeves forming a double conical bearing member, a plurality of tool-carrying hubs each having its bore to provide a pair of inwardly directed cone-shaped bearing surfaces cooperating with said sleeves for frictionally engaging the same, a single cone-shaped bearing sleeve mounted for rotation on the opposite end of the shaft and slidable longitudinally thereof, and flexible means in engagement with said single cone sleeve for urging the same toward the fixed bearing member thereby to retain the hubs and bearing members in frictional engagement.

3. A rotary tilling machine, comprising in combination, a casing adapted to be carried by a motor-driven vehicle, a tool shaft mounted for rotation in the walls of said casing, means for transmitting motion from the vehicle motor to said shaft, said means including a sprocket carried by the shaft for rotation therewith, radial ball bearings for said shaft and axial ball bearings for supporting the sprocket in the walls of the casing, and tilling tools frictionally carried by said shaft for rotation therewith.

4. A rotary tilling machine, comprising in combination, a main shaft adapted to be mounted for rotation in a motor-driven vehicle, means for transmitting motion from the vehicle motor to said shaft, a casing secured on a motor-driven vehicle, a tool shaft mounted for rotation in the walls of said casing, means for transmitting motion from said main shaft to said tool shaft and including a sprocket fast on said tool shaft, radial ball bearings for said tool shaft and axial ball bearings for supporting the sprocket in the walls of the casing, tilling tools frictionally carried by said shaft for rotation therewith, and means for regulating the frictional contact between the tilling tools and said shaft.

5. In a rotary tilling machine, a tool shaft mounted for rotation, a conical bearing member fixed on one end of the shaft and a conical bearing member slidably carried on the opposite end of said shaft, a plurality of tilling tools provided with hubs having conical bearing surfaces in frictional engagement with said bearing members, and means for exerting pressure on said hubs and bearing members longitudinally of the shaft thereby to regulate the degree of frictional connection between said hubs and bearing surfaces.

DINES CHRISTIAN PEDERSEN.